(12) United States Patent
Noritake et al.

(10) Patent No.: US 6,400,438 B1
(45) Date of Patent: **\*Jun. 4, 2002**

(54) GLASS BOARD USED IN THE PRODUCTION OF LIQUID CRYSTAL PANELS

(75) Inventors: Kazuto Noritake, Gifu; Masahiko Kawabe, Hashima; Hideki Matsuoka, Gifu; Minoru Nakano, Tokyo, all of (JP)

(73) Assignees: Sanyo Electric Co., Ltd., Osaka; Sony Corporation, Tokyo, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,419

(22) Filed: Mar. 27, 1998

(30) Foreign Application Priority Data

Apr. 4, 1997 (JP) .............................................. 9-086804

(51) Int. Cl.[7] ..................... G02F 1/1345; G02F 1/1337; G02F 1/1339; G02F 1/1333
(52) U.S. Cl. ....................... 349/149; 349/123; 349/153; 349/158
(58) Field of Search .......................... 349/42, 149, 158, 349/FOR 111, 153, 123, 139

(56) References Cited

U.S. PATENT DOCUMENTS

| 3,885,860 | A | * | 5/1975 | Sorkin ......................... 349/153 |
| 4,252,414 | A | * | 2/1981 | Kinugawa et al. ........... 349/153 |
| 5,148,300 | A | * | 9/1992 | Mizushima et al. ........... 349/42 |
| 5,410,423 | A | * | 4/1995 | Furushima et al. .......... 349/153 |
| 5,684,555 | A | * | 11/1997 | Shiba et al. ................. 349/149 |
| 5,783,289 | A | * | 7/1998 | Suzuki et al. ................ 349/158 |
| 5,897,188 | A | * | 4/1999 | Sasuga et al. ............... 349/149 |

\* cited by examiner

Primary Examiner—William L. Sikes
Assistant Examiner—Tarifur R. Chowdhury
(74) Attorney, Agent, or Firm—Sheridan Ross P.C.

(57) ABSTRACT

A glass board used in the production of liquid crystal panels includes a matrix of individual substrates. Each of the substrates has a contact portion of an electrode formed on one of its principle surfaces. The individual substrates are spaced from each other so that the contact portions of adjacent substrates are not in contact with each other. Thus, when the individual substrates are cut, the contact portions are not weakened and contaminants are prevented from getting between the contact portions and the substrates.

11 Claims, 5 Drawing Sheets

GLASS BOARD USED IN THE PRODUCTION OF LIQUID CRYSTAL PANELS

BACKGROUND OF THE INVENTION

The present invention relates to a mother glass board used to produce a plurality of transparent insulator substrates.

Referring to FIG. 1, a conventional circuit configuration of an active matrix type liquid crystal display (LCD) 100 will now be described. The LCD 100 comprises a display panel 101, a gate driver 103 and a drain (data) driver 104.

The display panel 101 has a plurality of gate wirings (scanning lines) G1–Gn and Gn+1–Gm and a plurality of drain wirings (data lines) D1–Dn and Dn+1–Dm. The gate wirings G1–Gm and drain wirings D1–Dm orthogonally cross forming pixel 102 at each point of intersection. The gate driver 103 is connected to the gate wirings G1–Gm to supply a gate signal (a scanning signal) thereto. The drain (data) driver 104 is connected to the drain wirings D1–Dm to supply a data signal (a video signal) thereto.

The drivers 103 and 104 form a peripheral drive circuit 105. A liquid crystal display, which includes the display panel 101 and at least one of the drivers 103 and 104 formed on an insulator substrate, is generally called a driver built-in liquid crystal display. The gate driver 103 or drain driver 104 may be provided on both sides of the display panel 101.

FIG. 2 shows an equivalent circuit for the pixels 102. Each pixel 102 comprises a TFT (Thin Film Transistor) 106, a liquid crystal cell LC and a supplemental capacitor (a storage or added capacitor) SC. The TFT 106 comprises a gate connected to the gate wiring Gn, a drain connected to the drain wiring Dn and a source connected to the supplemental capacitor SC and a display electrode (pixel electrode) 107 of the liquid crystal cell LC. The liquid crystal cell LC and supplemental capacitor SC form a signal storage element.

The liquid crystal cell LC has the display electrode 107 and an opposite electrode 17. The opposite electrode 17 is applied to a voltage of Vcom. The opposite electrode 17 is common to all of the pixels 102 and is also called a common electrode. The display electrode 107 and the opposite electrode 17 produce capacitance therebetween. The supplemental capacitor SC comprises a storage electrode 109 connected to the source of TFT 106 and a supplemental capacitor electrode 110. A constant voltage VR is applied to the supplemental capacitor electrode 110. The supplemental capacitor electrode 110 may be connected to the gate wiring Gn+1 adjacent to Gn.

Referring to FIG. 3, a partial cross-sectional view of the LCD 100 will now be described. The LCD 100 comprises opposing transparent insulator substrates 11 and 12, which are preferably made of glass material. A liquid crystal layer 13 filled with liquid crystal is provided between the substrates 11, 12. An aluminum alloy film 14 forming a wiring layer, an inter-layer insulating film 15 and an orientation film 16 which is preferably made of polyimide resin are laminated in the substrate 11. On the substrate 12, the opposite electrode 17 preferably made of an ITO (Indium Tin Oxide) film is formed, and a second orientation film 18 preferably made of polyimide resin is laminated.

Between the orientation films 16 and 18 on the peripheral portion of the insulated substrates 11 and 12, a sealing material 19 preferably made of epoxy resin is provided to prevent leakage of the liquid crystal of the liquid crystal layer 13.

A part of the aluminum alloy film 14 extends to the edge of the substrate 11 and forms a contact pad 20. The contact pad 20 may be a laminate of ITO and chromium (Cr) and be different from the film 14. A part of the opposite electrode 17 extends to the edge of the substrate 12 and forms a contact portion 22. The contact portion 22 is connected to the contact pad 20 with a conductive material 21. The voltage Vcom is applied to the contact pad 20. The voltage Vcom is supplied from the film 14 to the opposite electrode 17 via the conductive material 21 and the contact portion 22. The conductive material 21 is preferably made of resin mixed with conductive material.

As described above, the opposite electrode 17 formed on the peripheral portion of the substrate 12 is connected to the contact pad 20 formed on the border of the insulator substrate 11 via the conductive material 21. This arrangement facilitates wirings when mounting the liquid crystal display in various apparatus, such as a personal computer, a word processor, or an electronic notebook, using the contact pad 20 as a pad for the voltage Vcom, a power supply pad VR, a power supply pad for the peripheral drive circuit 105, and an input pad for a data signal. A plurality of the insulator substrates 11 and 12 are produced from one large plate glass (a mother glass board).

As shown in FIG. 4(a), a plurality of the insulator substrates 12 (12a–12d) are formed in square formation regions arranged in a matrix form on a mother glass board 31. The contact portions 22 of the opposite electrodes 17 of the adjacent substrates 12a–12d are connected to one another on the mother glass board 31. The board 31 is cut along the dotted line in FIG. 4(a) to provide separate insulator substrates 12, as shown in FIG. 4(b). When the substrates 12a–12d are cut from the mother glass board 31, the continued contact portions 22 of the opposite electrodes 17 are also cut off. Consequently, the edges of the contact portions 22 of the opposite electrodes 17 are exposed of extend outward from the border of the insulator substrate 12.

When the insulator substrates 12a–12d are cut away from the mother board, adhesion of the contact portions 22 to the substrates 12 is decreased by the stress applied to the mother board 31, especially by the external force concentrated at the periphery of the substrates 12a–12d. This permits moisture or contaminants to intrude into a clearance between the contact portions 22 and the substrates 12, decreasing the display performance and reliability. Moreover, such contaminants may corrode the opposite electrodes 17 and affect the liquid crystal layer 13 and the TFT 106.

Accordingly, it is an object of the present invention to provide a mother glass board for fabricating a liquid crystal display with improved reliability.

SUMMARY OF THE INVENTION

To achieve the above objective, the present invention provides a glass board for forming a plurality of liquid crystal display panels, comprising: a plurality of insulating substrates; an electrode formed on each of the insulating substrates, each of the electrodes having a main body portion, a peripheral edge and at least one contact portion extending from the peripheral edge, wherein the contact portions of adjacent insulating substrates are spaced from each other by a predetermined distance.

The present invention further provides a glass board for forming a plurality of liquid crystal display panels, comprising: a plurality of insulating substrates; an electrode formed on each of the insulating substrates, each of the electrodes having a main body portion, a peripheral edge and at least one contact portion extending from the peripheral edge, wherein the contact portions of adjacent insulating substrates are spaced from each so that when the insulating substrates are separated from each other, adhesion of the contact portions to their respective substrate is not compromised.

The present invention further provides a liquid crystal display apparatus comprising: a substrate; and a common electrode for liquid crystal cells located on the substrate within each formation region; wherein an end of each common electrode is located within the associated formation region such that adjacent ends of adjacent substrates are spaced from each other.

Other aspects and advantages of the invention will become apparent from the following description taken in conjunction with the accompanying drawings illustrating by way of example the principles of the invention.

BRIEF DESCRIPTION OF THE DRAWINGS

The present invention, together with objects and advantages thereof, may best be understood by reference to the following description of the presently preferred embodiments together with the accompanying drawings in which.

DETAILED DESCRIPTION OF THE PREFERRED EMBODIMENTS

Figure 5A:
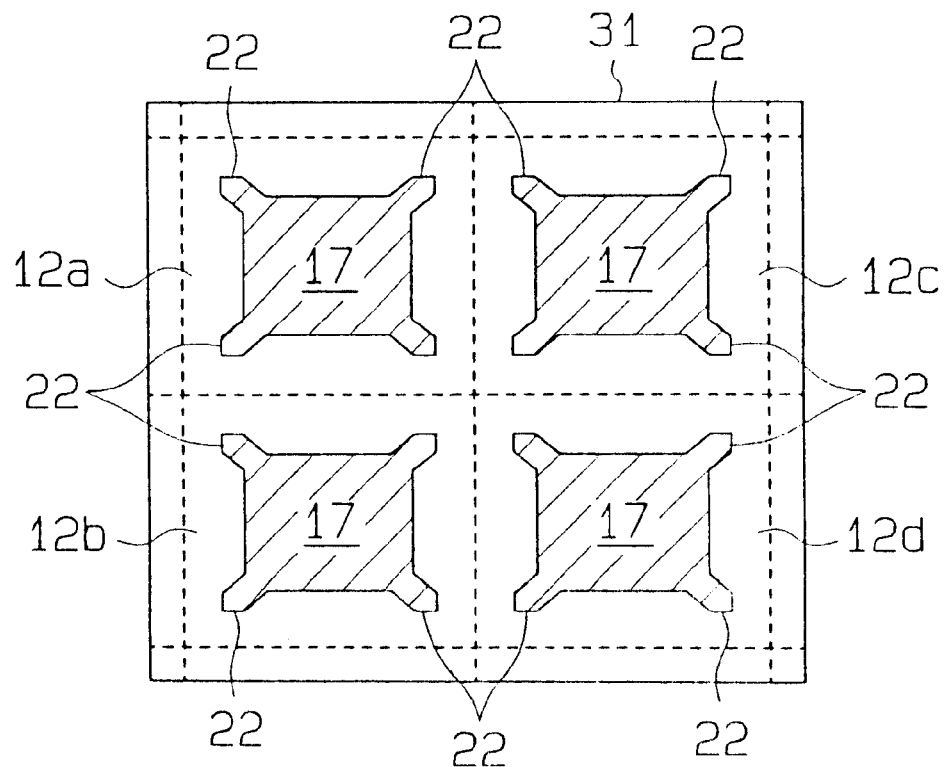
FIG. 5(a) is a schematic plan view showing a mother glass board in accordance with an embodiment of the present invention.
Figure 5B:
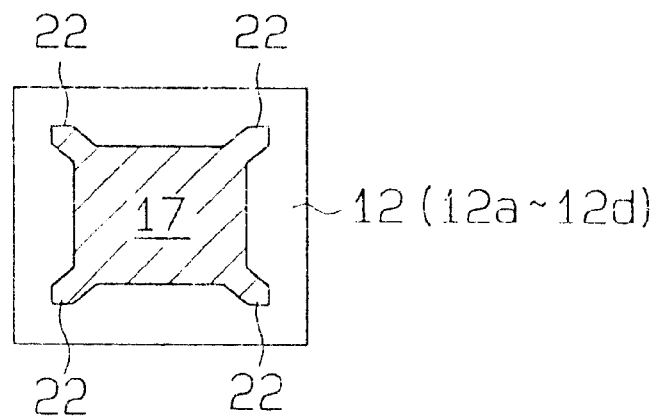
FIG. 5(b) is a schematic plan view showing one of the transparent insulator substrates of FIG. 5(a)

An embodiment of the present invention will now be described referring to drawings. Referring to FIG. 5(a), a plurality of formation regions for forming insulator substrates 12 (12a–12d) are arranged in a matrix form on a generally square mother glass board 31. In the substrates 12a–12d, the contact portions 22 of the opposite electrodes 17 are formed independently for each substrate. That is, each end of the contact portions 22 are arranged within the substrates 12a–12d partitioned by the cutting line or the dotted line in FIG. 5(a) such that the contact portions 22 of the individual substrates 12 are separated or isolated from each other. The distance between each adjacent contact portion is preferably more than 4 $\mu$m. The distance is more preferably more than 100 $\mu$m. The distance is ideally more than 400 $\mu$m.

When the insulator substrates 12a–12d are cut away with a cutter, preferably by means of scribing and breaking, from the mother glass board 31 along the dotted line in FIG. 5(a), the edges of the contact portions 22 of the opposite electrodes 17 do not extend beyond or to the borders of the substrates 12a–12d. Therefore, when the substrates 12a–12d are cut off, any force acting on the substrates 12 is not directly applied to the contact portions 22. Accordingly, adhesion of the contact portions 22 to the substrates 12 are maintained eliminating the possibility of penetration of moisture or contaminants between the contact portion 22 and the substrate 12.

Figure 1:
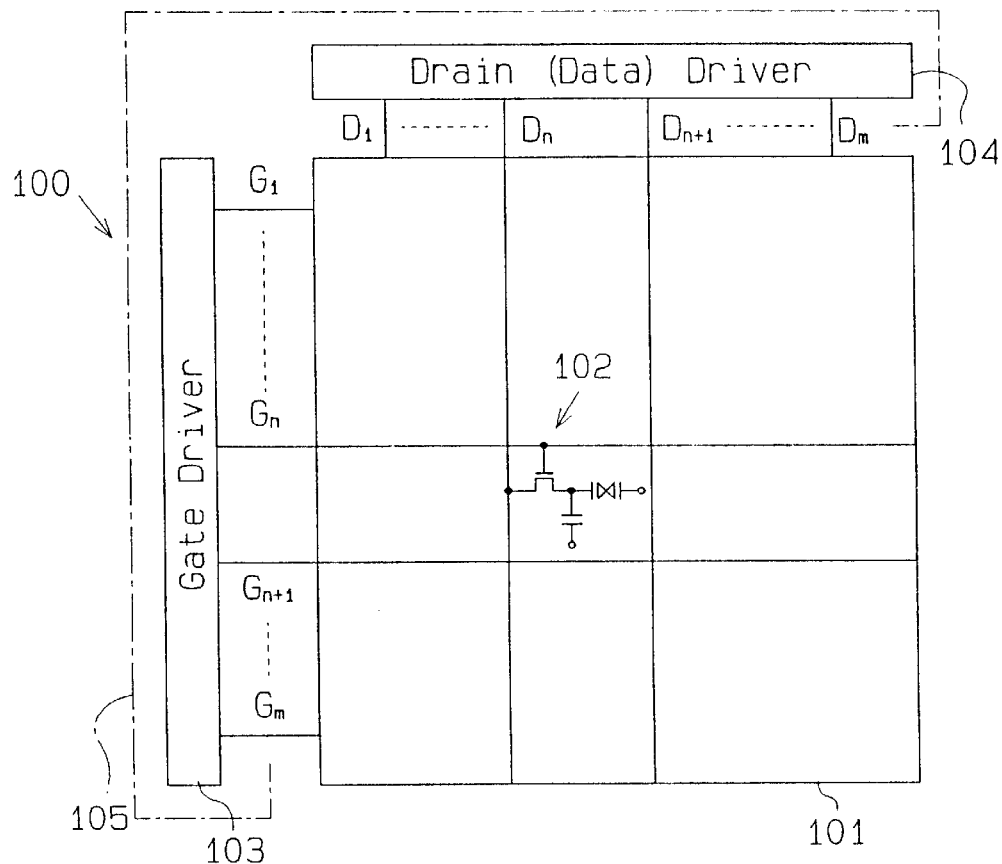
FIG. 1 is a schematic block diagram showing the electrical configuration of a conventional liquid crystal display.
Figure 2:
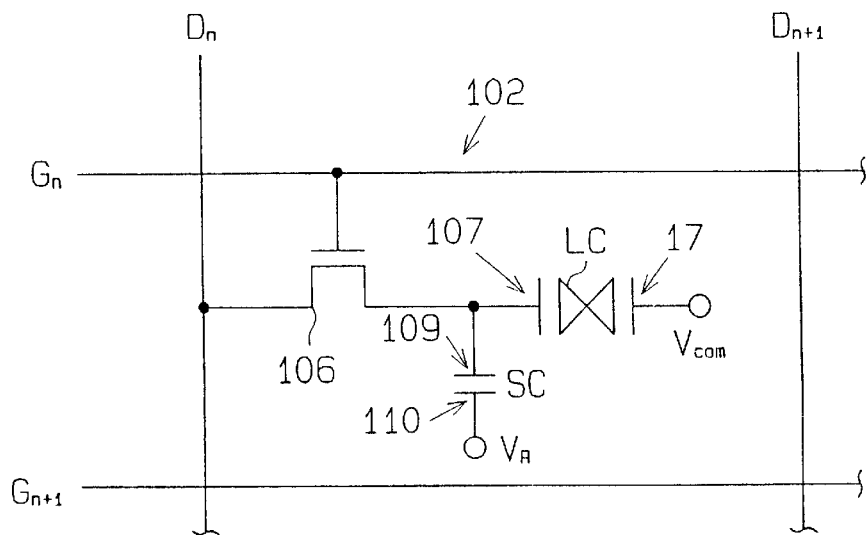
FIG. 2 is an equivalent circuit for a pixel of the liquid crystal display of FIG. 1.
Figure 3:
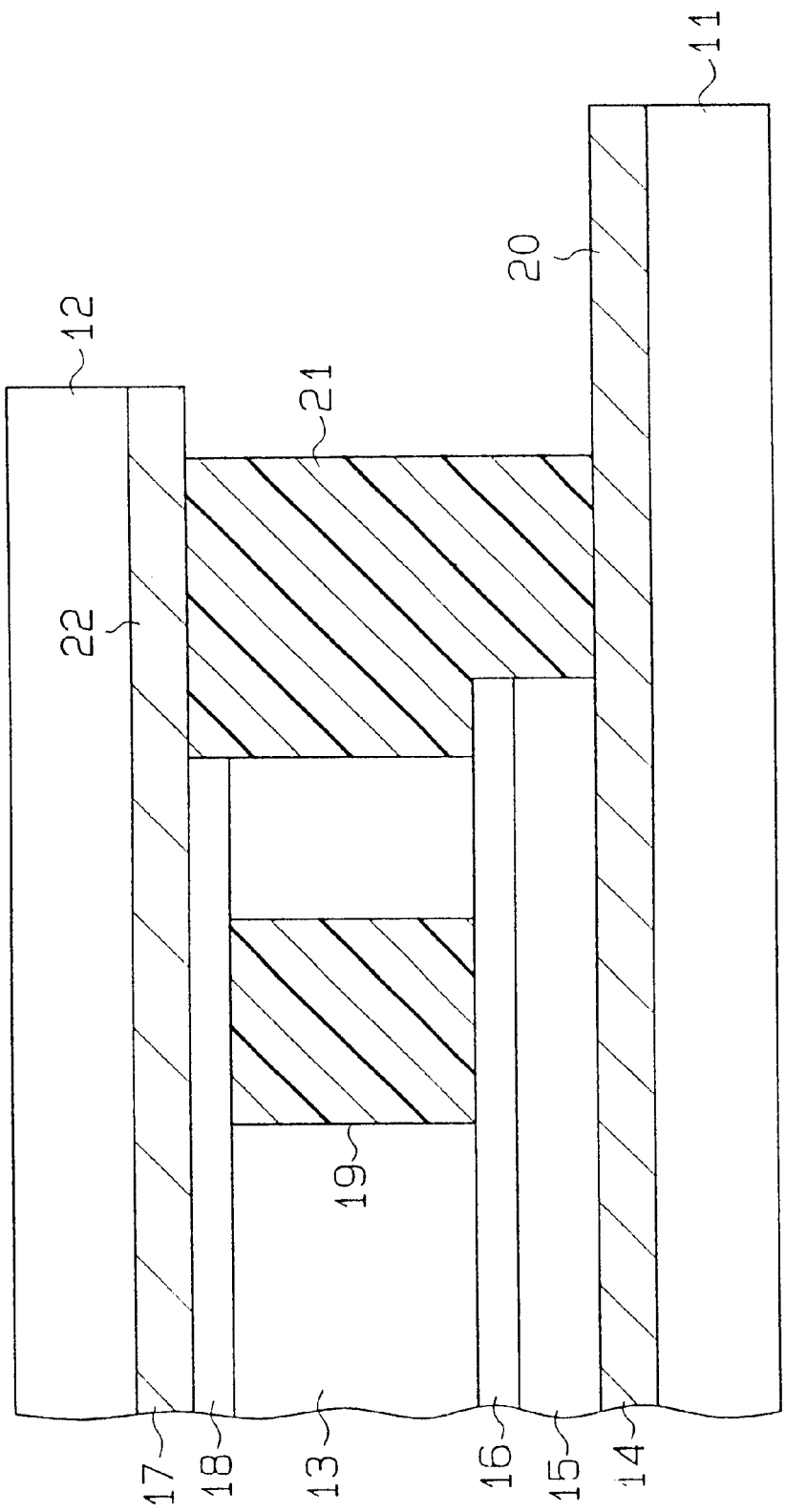
FIG. 3 is a partial cross-sectional view showing the liquid crystal display of FIG. 1.
Figure 4A:
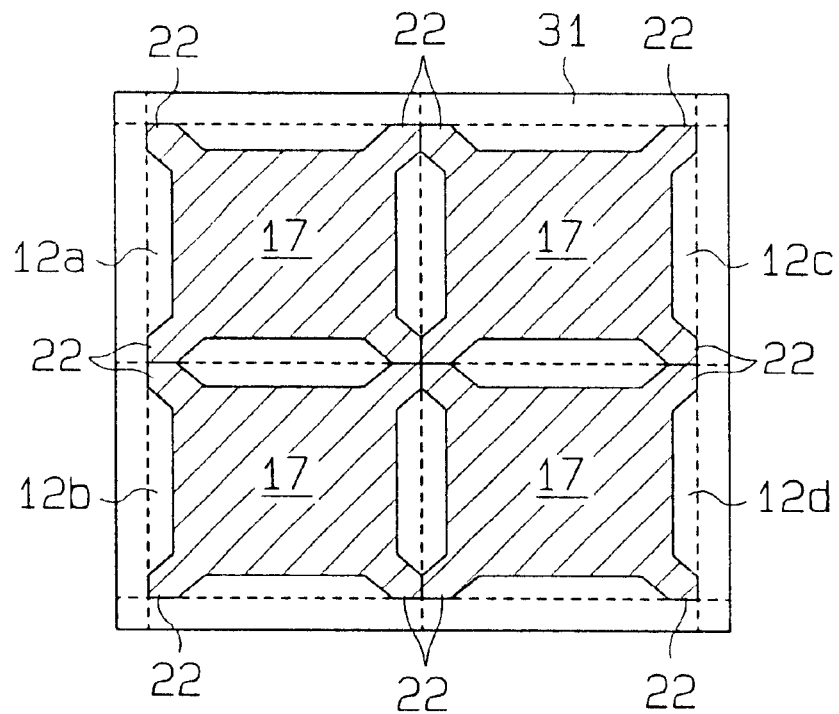
FIG. 4(a) is a schematic plan view showing a mother glass board comprising a plurality of transparent insulated substrates.
Figure 4B:
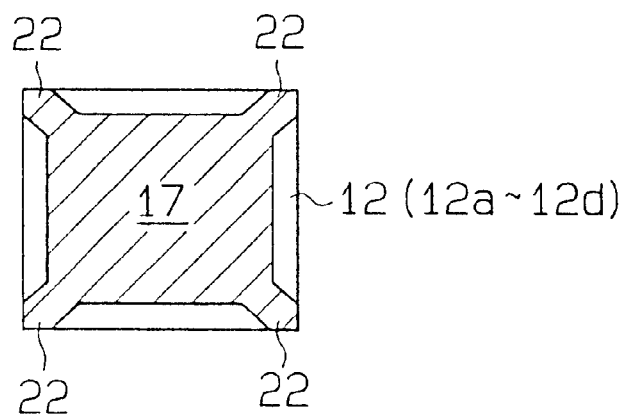
FIG. 4(b) is a schematic plan view showing one of the transparent insulator substrates of FIG. 4(a)
Figure 6:
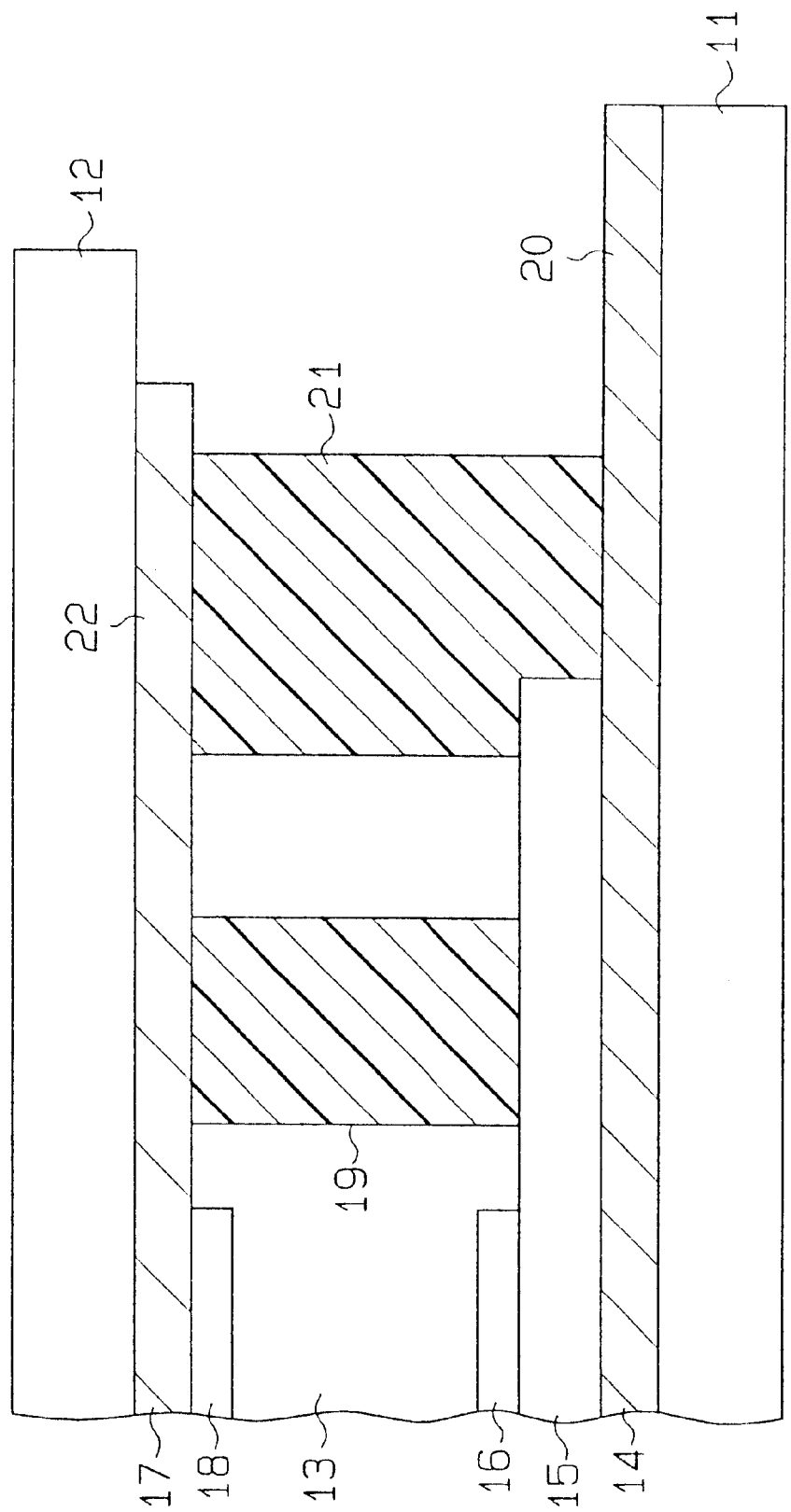
FIG. 6 is a partial cross-sectional view showing a liquid crystal display employing the insulator substrates of FIG. 5(b).

Referring to FIG. 6, each separated substrate 12 is used to fabricate a liquid crystal display. The structure of the liquid crystal display is substantially the same as the conventional liquid crystal display except for the area or spacing which separates the contact portions 22 of adjacent substrates 12. Consequently, the liquid crystal layer 13 and the TFT 106 (see FIG. 4) provided between the substrates 11 and 12 are prevented from being corroded by contaminants. This prevents manufacture of defective displays caused by the contaminants and improves reliability of the liquid crystal display.

Therefore, the present embodiment is to be considered as illustrative and not restrictive and the invention is not to be limited to the details given herein, but may be modified within the scope and equivalence of the appended claims.

What is claimed is:

1. A glass board for forming a plurality of liquid crystal display panels, comprising:

a plurality of insulating substrates formed from said glass board;

an electrode formed on each of the insulating substrates, each of the electrodes having a main body portion, a peripheral edge and at least one contact portion extending from the peripheral edge, wherein the contact portions of adjacent electrodes of said plurality of insulating substrates are spaced from each other by a first predetermined distance, and an end of each of the contact portions is positioned at least a second predetermined distance from an edge of its respective insulating substrate, and wherein the insulating substrates are separated from one another by cutting the glass board between the adjacent contact portions, so that adhesion of the contact portions to their respective substrate is maintained;

a sealing material located on the peripheral edge of each of the electrodes; and an orientation film located on each of the electrodes and within the sealing material, wherein the sealing material defines a perimeter, wherein the orientation film is located within said perimeter, and wherein the orientation film and the sealing material do not overlap each other.

2. The glass board of claim 1, wherein the plurality of insulating substrates are formed as a matrix.

3. The glass board of claim 1, wherein the plurality of insulating substrates are generally square shaped and include a contact portion extending from each corner thereof.

4. The glass board of claim 1, wherein the electrode includes an ITO (Indium Tin Oxide) film.

5. A glass board for forming a plurality of liquid crystal display panels, comprising:

a plurality of insulating substrates formed from said glass board;

an electrode formed on each of the insulating substrates, each of the electrodes having a main body portion, a peripheral edge and at least one contact portion extending from the peripheral edge, wherein the contact portions of adjacent electrodes of said plurality of insulating substrates are spaced from each other by a first predetermined distance so that when the insulating substrates are separated from each other by cutting the glass board between the adjacent contact portions, adhesion of the contact portions to their respective substrates is maintained and an end of each of the contact portions is positioned at least a second predetermined distance from an edge of its respective insulating substrate;

a sealing material located on the peripheral edge of each of the electrodes; and an orientation film located on each of the electrodes and within the sealing material, wherein the sealing material defines a perimeter, wherein the orientation film is located within said perimeter, and wherein the orientation film and the sealing material do not overlap each other.

6. A liquid crystal display apparatus comprising:

first and second substrates, wherein a plurality of first substrates are formed by cutting a glass board where a plurality of substrates are defined thereon;

a common electrode located on each of the first substrates within a formation region of liquid crystal cells, wherein an end of the common electrode is positioned at least a predetermined distance from an edge of a respective first substrate so that when the first substrates are separated from each other by cutting the glass board between the adjacent common electrodes, adhesion of each common electrode to its respective first substrate is maintained;

a wiring layer located on the second substrate;

a sealing material located between the common electrode and the wiring layer, wherein the sealing material defines a perimeter;

a first orientation film located on the common electrode and within the sealing material; and a second orientation film located over the wiring layer and within the sealing material, wherein the first and second orientation films are located within said perimeter defined by said sealing material, and wherein the first and second orientation films do not overlap the sealing material.

7. The liquid crystal display apparatus according to claim 6, wherein each formation region has a generally rectangular shape, and each common electrode includes a rectangular portion that has an area smaller than that of the formation region and a contact portion extending outward from each corner of the rectangular portion.

8. The liquid crystal display apparatus according to claim 7, wherein each common electrode is located at substantially the center of the associated formation region such that the contact portion is separated from the associated corner of the formation region.

9. The liquid crystal display apparatus according to claim 6, wherein the common electrode includes ITO (Indium Tin Oxide) film.

10. A glass board for forming a plurality of liquid crystal display panels, comprising:

a plurality of insulating substrates formed from said glass board;

an electrode formed on each of the insulating substrates, wherein an end of the electrode is positioned at least a predetermined distance from an edge of its respective insulating substrate, and wherein the insulating substrates are separated from one another by cutting the glass board between the adjacent contact portions, so that adhesion of the electrodes to their respective substrate is maintained;

a sealing material located on a peripheral portion of each of the electrodes; and an orientation film located on each of the electrodes and within the sealing material, wherein the sealing material defines a perimeter, wherein the orientation film is located within the perimeter, and wherein the orientation film and the sealing material do not overlap each other.

11. A liquid crystal display apparatus comprising:

first and second substrates, wherein the first substrate is formed by cutting a glass board where a plurality of substrates are defined thereon;

a common electrode for liquid crystal cells located on the first substrate, wherein an end of the common electrode is positioned at least a predetermined distance from an edge of the first substrate so that when the first substrates are separated from each other by cutting the glass board between the adjacent common electrodes, adhesion of the common electrode to the first substrate is maintained;

a wiring layer located on the second substrate;

a sealing material located between the common electrode and the wiring layer, wherein the sealing material defines a perimeter;

a first orientation film located on the common electrode and within the sealing material; and a second orientation film located over the wiring layer and within the sealing material, wherein the first and second orientation films are located within the perimeter defined by the sealing material, and wherein the first and second orientation films and the sealing material do not overlap each other.

* * * * *